United States Patent [19]

Moore et al.

[11] Patent Number: 4,564,079

[45] Date of Patent: Jan. 14, 1986

[54] DIGITIZER PAD

[75] Inventors: Cecil A. Moore, San Jose, Calif.; Gordon B. Langford, Glendale, Ariz.

[73] Assignee: Koala Technologies Corporation, San Jose, Calif.

[21] Appl. No.: 635,381

[22] Filed: Jul. 30, 1984

[51] Int. Cl.[4] .............................................. G08C 21/00
[52] U.S. Cl. .................................. 178/18; 200/159 B
[58] Field of Search ............................. 178/18, 19, 20; 340/712, 365 VL, 365 C; 200/159 B

[56] References Cited

U.S. PATENT DOCUMENTS 4,455,450  6/1981  Margolin ................................ 178/18
4,501,938  2/1985  Kawauchi ...................... 200/159 B X Primary Examiner—Stafford D. Schreyer
Attorney, Agent, or Firm—Thomas S. MacDonald; Alan H. MacPherson; Steven F. Caserza

[57] ABSTRACT

A digitizer pad has multiple contact points between facing conductive or resistive coated surfaces of spaced planar sheets (11,16). The sheets are joined by an energy-storing hinge means (13) at the periphery of the respective sheets. Pressing of a top sheet against the bottom sheet by a stylus or operator finger force makes a finite electrical point contact, or series of discrete electrical contacts as the stylus or finger is moved across the top sheet while continuing to depress the sheet, and the X-Y coordinates of the contact(s) determined and indicated on a video screen or the like. Release of the energy stored in the hinge by depression of the top sheet returns sheet (11) into separated position from sheet 13 at that point of contact.

10 Claims, 8 Drawing Figures

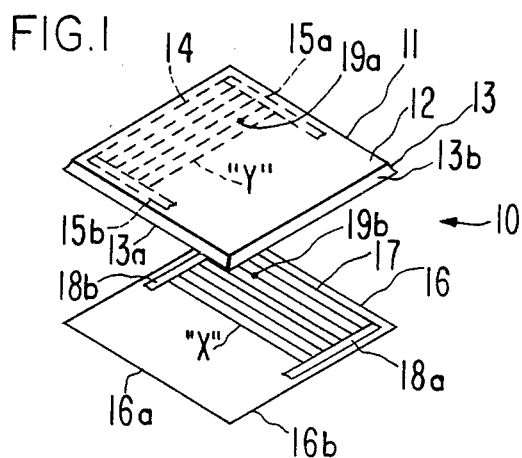
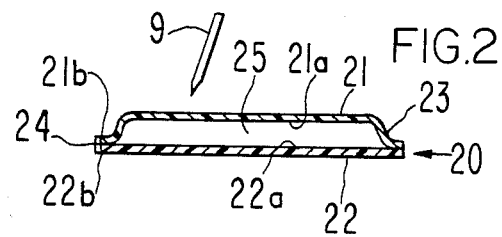
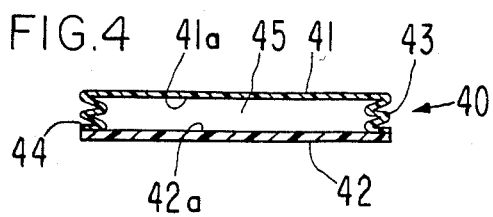
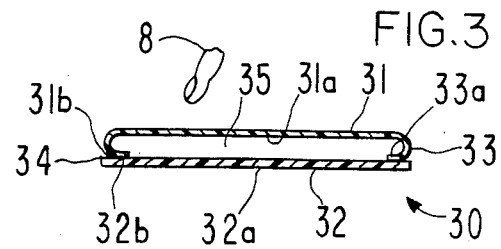
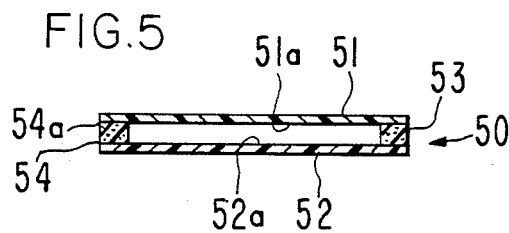
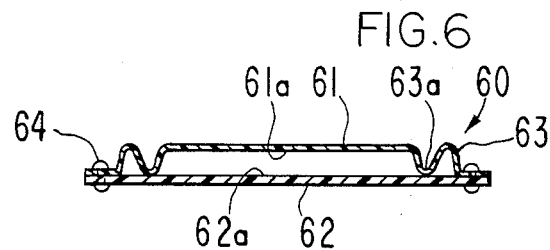
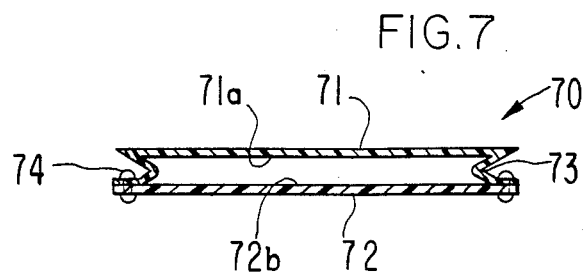
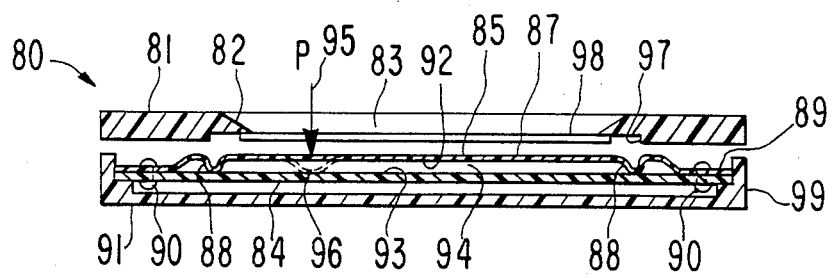

DIGITIZER PAD

BACKGROUND OF THE INVENTION

1. Reference to Related Applications

This invention relates to U.S. Application Ser. Nos. 475,419 and 475,418, now U.S. Pat. No. 4,484,026,filed Mar. 15, 1983 and Mar. 15, 1983 and having a common ownership. The disclosure of such applications are incorporated herein by reference.

2. Field of the Invention

This invention pertains to a digitizer pad or touch tablet usable as a discriminating electrical contact sensor or a graphical input terminal. Two or more, generally parallel, planar and spaced sheets having conductive or resistive coatings thereon, are pressed together by a stylus force or an operator's finger force at essentially one contact point at any position on the top sheet surface to electrically indicate the x-y coordinates of the point touched. More particularly the invention is directed to a means for normally separating the parallel sheets and returning the depressed sheet into parallelism with the other sheet when the stylus or human operator finger force is removed. "Digitizer Pad" as used herein means a pad or touch tablet having at least 10 electrical input points per square inch on its facing operable surfaces, including an infinity of points as in a continuous resistive surface.

3. Description of the Prior Art

Digitizer pads are illustrated in U.S. Pat. No. 3,911,215 wherein top and bottom sheets having conductive or resistive surfaces thereon are separated by a gridwork of particularly sized and spaced multiple projections on a surface of one of the sheets in facing contact with a surface of the other of the sheets. A stylus having a tip of prescribed radius of curvature is used to depress a flexible first sheet between adjacent projections so that contact is made between facing conductive or resistive layers by the projections. In this device the peripheral edges of the sensor sheets are held in a device frame separated by peripheral projections. U.S. Pat. No. 3,969,585 shows a graphical input terminal in which top and bottom resistive sheets (carbon on plastic) are separated by an air gap with the top sheet tensioned over a frame by Neoprene tubing and the sheets spaced from one another by a 1.5 mm plastic spacer. Each of these designs necessitate very close spacing i.e. 0.129–1.5 mm, of the facing surfaces of the sheets which results in a tablet or pad of unwanted extreme sensitivity which can emit spurious signals when brushed by a operator in case of the '585 patent or require a particular stylus and stylus force in the case of the '215 patent. Each of these prior art devices relies on the inherent flexibility of the top sheet itself to effect return to the separated or spaced position. This tends to limit the selection of materials and thickness of the top sheet. Further, with respect to each of the prior art patents there is little "feel" of any positive returning action especially when ambient temperatures are high and the top plastic sheet softens and sags. Thus, there has been a need of a digitizer pad having an uninterrupted output, a self-supporting top surface and a simple assembly method.

SUMMARY

The present invention meets the objectives above by providing an effective peripheral energy-storing hinge preferably on the top sheet which allows the top sheet to be depressed by stylus or finger force at any point on its top surface area. The hinge surrounds that surface area. Upon cessation of the stylus or finger force, the stored energy is released returning the top sheet to a fully separated position with respect to the bottom sheet. The energy-storing hinge may in its preferred mode integrally depend from the peripheral edges of the top sheet to attachment to peripheral edges of the bottom sheet or base and may be in the form of an embossed edge, a 180° folded edge, an accordion-folded edge or a foamed plastic or foamed rubber spacer. The preferred mode of the invention is a U-shaped peripheral embossment which functions to best meet the above objectives. It further permits a construction which is reliable, repeatable and can be inexpensively and simply manufactured.

BRIEF DESCRIPTION OF DRAWINGS

FIG. 1 is a schematic prospective exploded view of a sheet portion of a digitizer pad according to the invention.

FIG. 2 is a cross-sectional side view of a digitizer pad of FIG. 1 showing an embossed edge.

FIG. 3 is a cross-sectional side view of an embodiment of a digitizer pad having its peripheral edges curved inwardly 180°.

FIG. 4 is a cross-sectional side view of a further embodiment of a digitizer pad having an integral hinge of an accordion-folded construction.

FIG. 5 is a cross-sectional side view of a digitizer pad showing an embodiment having its peripheral hinge comprising foam material.

FIG. 6 is a cross-sectional side view of a digitizer pad showing an embodiment having an integral formed energy-storing hinge with a medial reentrant portion.

FIG. 7 is a cross-sectional side view of a modified digitizer pad having a single accordion folded hinge portion.

FIG. 8 is a cross-sectional side view of the preferred embodiment of the overall digitizer pad.

DETAILED DESCRIPTION

As shown in FIG. 1 the digitizer pad 10 of the invention is basically made up of two planar sheets 11, 16 of plastic material which are brought into touching registration. The sheets have either resistive layers or conductive pathways applied on facing surfaces so that when the top surface of the top sheet is physically pressed by a stylus or operator's finger force the electrically conductive surfaces underneath that point are placed in electrical contact and the x-y coordinates of that point of contact determined.

The resistant sheets may be fabricated from conductive ink on a plastic substrate such as carbon-coated Mylar polyester or other suitable material having a resistance of approximately from 1K to 100K ohms per square. The underside of sheet 11 and top side of sheet or base 16 are spaced apart by a small air gap typically from about 40 mm to 60 mm or may be separated by a layer of electrically switching polymer which becomes conductive upon the application of pressure over a suitable threshold. The resistive coatings may in the case of a commercial digitizer pad embodiment provide for approximately 2500 contact points per square inch although higher and lower densities are possible.

Top sheet 11 has a top surface area 12 and peripheral edges, the latter forming an energy-storing hinge means 13 which stores energy resultant from a force being applied at any point on the medial surface area portions 12 of the sheet 11. For example, pressing surface area 12 above point 19a make electrical contact between points 19a and 19b while storing the pressing energy in the hinge 13. Tension is induced in the top surface by the energy stored in the hinge means tending to keep the sheets separated. Upon release of the pressing force the stored energy in the hinge means 13 separates points 19a and 19b and returns the sheet 12 to its original spaced position with respect to sheet 16. Edge portions 13a and 13b of hinge means 13 are fixedly attached to peripheral edge portion 16a and 16b of bottom sheet 16 completely around sheet 16.

In the shown embodiment y-axis coordinates comprising electrical pathways 14 extend in parallel on the underside of sheet 12 with bus bars 15a and 15b connecting the various electrical paths 14. Application of an energizing potential is applied to bus bar 15a and a uniform voltage gradient is established across sheet 12 in a direction perpendicular to the bus bars. Similarly, application of an energizing potential is made to bus bars 18a and 18b on sheet 16 across the resistive pathways 17 extending between the bus bars so as to form X axis coordinates. Since the electrodes or bus bars in sheet 12 run parallel to the Y axis and the bus bars on sheet 16 run parallel to the X axis, orthogonal gradients in the X and Y directions are created on sheets 11 and 16 respectively. Accordingly, every point of the central area 12 of the sheet 11 and the corresponding central area of sheet 16 is uniquely defined by a position along the X and Y directions or axes. For example, when contact point 19a is pressed, the electrical contact point under that point on the underside of surface 12 and the point 19b on the upper side of the bond sheet 16 is placed into contact with contact point 19b on sheet 16 to define the x and y coordinates of that particular contact point. The energizing potential may be supplied and the X-Y axis coordinate signal utilized as shown in U.S. Pat. No. 3,959,585 or in the above recited related patent applications or as used in other prior art devices.

FIG. 2 shows a cross-sectional view of a pad 20 taken across an X or Y axis position upon normal registration of the top and bottom sheets of FIG. 1. Top sheet 21 has a depending integrally formed embossed ridge 23 extending downwardly towards sheet 22. Sheet 21 is made of plastic material of sufficient flexibility to be depressed and moved inwardly under the action of the embossed hinge 23 toward the top surface of bottom sheet 22. Bottom sheet 22 may be relatively rigid with respect to sheet 21 and contains a top surface 22a facing the under surface 21a of sheet 21 spaced by gap 25. Each of these facing surfaces are resistive or conductively coated as shown in FIG. 1. Upon depression of any point on the top surface of sheet 21 by stylus 9 the particular point of contact between the sheet is indicated in terms of its X-Y coordinates and that signal appropriately amplified and transmitted to a distant location or suitably decoded or otherwise processed to graphically indicate the position of the stylus or finger making the point contact on the surface of the top sheet 21. Upon release of the stylus or operator finger force the stored energy in hinge 23, stored by the application of the stylus or finger force, is released by hinge 23, returning the sheet 21 back to its original position prior to the imposition of the depressing force.

FIG. 3 is a further modification of the digitizer pad 30 in which a folded edge 33 is employed as the energy-storing hinge means. The top sheet 31 comprises an edge 33a which is folded downwardly and inwardly at approximately 180° so that the top of the folded tip of edge 33a is spaced from the planar underside of sheet 31. The folded-over under portions 31b of the hinge are adhered or otherwise connected by suitable means 34 to peripheral edge portions 32b of the bottom sheet 32. Suitable resistive coatings or conductive paths are placed as above on the inner facing surfaces 31a and 32b. Again as the top surface 31 is depressed by finger tip 8 toward the fixed surface 32 by stylus or operator finger force a point contact is made between surfaces 31a and 32b completing an electrical contact. At the same time the energy from the stylus or finger force is stored in hinge 33 and when that stylus or finger force is removed from that point that stored energy returns top sheet 31 to its spaced position with respect to bottom sheet 32 breaking the circuit. It is to be understood that the stylus or finger may trace a continual or intermittent path and each movement is translated in terms of X and Y coordinates to a cursor or other movement on a video screen or the like.

FIG. 4 shows a further embodiment 40 in which an integral accordion-shaped hinge means 43 is provided which extends downwardly from top sheet 41 to affixation at 44 to bottom sheet 42. Surfaces 41a and 42a are in facing spaced relation and when a point contact is made between sheets 41 and 42, gap 45 at that point of contact becomes zero and a physical contact between conductive or resistive paths on the facing surfaces is made. Upon release of the stylus or finger force the energy stored in the accordion hinge 43 is released returning the top sheet 41 and gap 45 to its original position and size.

The embodiment 50 of FIG. 5 includes a sponge rubber or foamed plastic hinge 53 not integral with either the top sheet 51 or bottom sheet 52. Conductive or resistive surfaces are provided on the facing surfaces 51a and 52a of the respective sheets 51 and 52. Annular foam rubber spacer 53 is bonded at the peripheral edges around the entire picture-frame periphery of the digitizer pad as at 54 and 54a to the top and bottom sheets. As sheet 51 is placed into point contact with sheet 52 the movement of sheet 51 stores energy in the foam rubber spacer and upon removal of the stylus or finger force that stored energy releases and returns the sheet 51 to its original position so that there is no electrical contact between points on surfaces 51a and 52a.

FIG. 6 is a still further modification 60 in which an embossed edge portion 60 is provided around the peripheral portions of top sheet 61 and attached to bottom sheet 62 by a fastener 64. The hinge portion comprises an embossed portion which has a medial reentrant portion 63a which affords additional flexibility and allows for a degree of lateral movement of reentrant portion 63 with respect to the top surface 62a of bottom sheet 62. As top sheet 61 is pressed into point contact at any point in the contact area inward of peripheral hinge 63, contact is made between conductive or resistive coated surfaces 61a and 62a. Removal of the stylus or finger force or movement of the stylus or finger, as in the other embodiments releases or partially releases the energy stored in hinge means 63 and returns sheet 61 into spaced relationship with respect to all or part of bottom sheet 62.

The FIG. 7 modification 70 utilizes a single accordion edge hinge means 73 which may be mechanically joined by appropriate rivets 74 or the like to the bottom sheet 72. As sheet 71 is depressed at point contact towards sheet 72 energy is stored in the hinge means 73 and upon removal of the stylus or finger force the hinge 73 includes means to return the surface 71 into its original spaced position with respect to sheet 72.

FIG. 8 illustrates an overall digitizer pad 80 including an upper rectangular plastic outer frame 81 having an opening 83 with sloped sidewalls 82 forming the area for the tablet operating surface. In its commercial 5½" square tablet form this area is 4.25"×4.25". The frame is constructed of Lexan polycarbonate plastic. A PCB-type base or sheet 84 is provided to which the upper sheet 85 is staked by plastic rivets 90. Rivets 90 are inserted in peripheral apertures in sheet 85 and base or sheet 84 and are heat-staked by mushrooming the rivets at 91 on the underside of base 84. About five rivets are employed on each side of the rectangular assembly i.e. three rivets between each corner rivet resulting in 16 total rivets. The staking operation pulls down the edges 89 of sheet 85 to sheet 84 and the flexing action of embossment 88 bulges sheet 85 upwardly as at area 87 so that in neutral position—unpressed by a finger or stylus—the gap 94 at the center of the pad area is about 60 mils while the height of the embossment is about 50 mils. The inner surface of kerf 97 in frame 81 is spaced from the top of the embossment when the frame 81 is attached to a housing bottom 99. Base 84 when assembled sits on an inner ridge of bottom 99. Appropriate electronic components for processing signals indicative of the x-y coordinates of a pressed point are mounted in the space between base 84 and the bottom casing 99.

The width of the embossment 88 on sheet 85 is about 100 mils and the thickness of the PCB material is about 62 mils. The underside of sheet 85 has a resistive coating or conductive strips 92 and the top surface of base 84 has a resistive surface or conductive strips 93. Pressure by stylus or finger 95 at arrow point P depresses sheet 85 so that contact is made at x-y axis point 96 on surfaces 92 and 93. Upon release of a preferred 1 to 6 ounce pressure the central surface of sheet 85 will "snap" back into the spaced position with sheet or base 84 by reason of the release of stored energy (from the pressure P) by removal of that actuating pressure force P.

The top sheet in each of the above embodiments may be made of flexible plastic material and typically, in an 5"×5" digitizer pad, be of a thickness of 7 to 10 mils. The peripheral edges may be integrally formed in the embossed edges of FIGS. 1–4, 6 and 7 by placing a flat Mylar sheet between a pair of metal embossing plates, one plate having a peripheral ridge and the other plate having a facing peripheral channel. Upon application of a suitable pressure, and temperature, such as approximately 100° C., for sufficient time the Mylar sheet becomes heat set and permanently deformed in the shape represented by the matching ridge and channel. Alternatively, a ram force may be applied to a rubber sheet above the Mylar sheet and the peripheral edges of the sheet forced into a peripheral channel in a fixed anvil plate whereby the edges of the sheet are permanently deformed. The bottom sheet may either be a rigid sheet of standard printed circuit board material such as polyvinyl chloride or a fixed surface of resistive-coated aluminum or the like.

The above description of embodiments of this invention is intended to be illustrative and not limiting. Other embodiments of this invention will be obvious to those skilled in the art in view of the above disclosure.

We claim:

1. In a digitizer pad having two or more spaced parallel sheets having at least two electrically-isolated facing surfaces, said pad having at least ten electrical input points per square inch on said facing surfaces, adapted to be brought into point contact when pressed by a stylus or human operator finger, the improvement comprising:
   a top flexible sheet depressible by stylus or finger force;
   a substantially inflexible bottom sheet;
   a energy-storing flexible hinge means attached to and extending between peripheral edge portions of said top sheet and said bottom sheet for normally electrically separating said sheets, depression of said top sheet causing energy to be stored in said hinge means; and
   wherein stored energy in said hinge means is released by cessation of said stylus or finger force for returning said sheets into electrical separation at said point contact.

2. The digitizer pad of claim 1 in which said top and bottom sheets are planar.

3. The digitizer pad of claim 1 in which said top and bottom sheets are normally spaced apart from 40 to 60 millimeters.

4. The digitizer pad of claim 1 in which said energy-storing flexible hinge integrally depends from the peripheral edges of the top sheet to attachment with the peripheral edge portions of the bottom sheet.

5. The digitizer pad of claim 4 in which said energy-storing flexible hinge comprises an embossed downwardly-extending peripheral edge of said top sheet.

6. The digitizer pad of claim 4 in which said energy-storing flexible hinge comprises a downwardly and 180° folded spaced edge extending inwardly of said top sheet peripheral edges.

7. The digitizer pad of claim 4 in which said energy-storing flexible hinge comprises an depending accordion-folded edge portion.

8. The digitizer pad of claim 4 in which said energy-storing flexible hinge comprises an embossed ridge having a medial reentrant curve portion increasing the flexibility of the ridge.

9. The digitizer pad of claim 1 in which said energy-storing hinge comprises a foam spacer attached to and extending peripherally around facing peripheral surfaces of said top and bottom sheets.

10. The digitizer pad of claim 1 in which said top and bottom sheets are physically separated by said hinge means except when said top sheet is pressed.

* * * * *

UNITED STATES PATENT AND TRADEMARK OFFICE
CERTIFICATE OF CORRECTION

PATENT NO. : 4,564,079

DATED : Jan. 14, 1986

INVENTOR(S) : Moore et al.

It is certified that error appears in the above-identified patent and that said Letters Patent is hereby corrected as shown below:

Col. 4, line 13, replace "Contact" with --circuit--.

Signed and Sealed this

Twenty-fourth Day of June 1986

[SEAL]

Attest:

DONALD J. QUIGG

Attesting Officer

Commissioner of Patents and Trademarks